United States Patent
Griffin et al.

(10) Patent No.: US 8,099,526 B2
(45) Date of Patent: Jan. 17, 2012

(54) METHOD AND APPARATUS FOR ENABLING AND DISABLING A LOCK MODE BY SQUEEZING OR PINCHING THE SIDES OF A PORTABLE ELECTRONIC DEVICE TOWARDS ONE ANOTHER

(75) Inventors: Jason Griffin, Waterloo (CA); Steven Fyke, Waterloo (CA); Norman Ladouceur, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 306 days.

(21) Appl. No.: 12/017,470

(22) Filed: Jan. 22, 2008

(65) Prior Publication Data

US 2009/0187676 A1    Jul. 23, 2009

(51) Int. Cl.
 *G06F 3/00* (2006.01)
 *G06F 12/14* (2006.01)
 *G06F 1/66* (2006.01)

(52) U.S. Cl. ............... 710/14; 710/15; 710/18; 710/67; 455/411; 455/404.1; 455/404.2; 455/550.1; 713/310

(58) Field of Classification Search ............. 710/14–19; 345/173, 175; 713/1, 2, 310; 340/574; 455/404.1, 455/2
See application file for complete search history.

(56) References Cited

U.S. PATENT DOCUMENTS

| | | | | |
|---|---|---|---|---|
| 4,612,419 | A | 9/1986 | Smith | |
| 5,420,570 | A * | 5/1995 | Leitten et al. | 340/574 |
| 7,159,120 | B2 * | 1/2007 | Muratov et al. | 713/182 |
| 7,212,835 | B2 * | 5/2007 | Mantyjarvi et al. | 455/550.1 |
| 7,231,231 | B2 * | 6/2007 | Kokko et al. | 455/566 |
| 7,251,471 | B2 * | 7/2007 | Boling et al. | 455/404.2 |
| 7,287,172 | B2 * | 10/2007 | Parker | 713/310 |
| 7,433,672 | B2 * | 10/2008 | Wood | 455/404.1 |
| 7,453,443 | B2 * | 11/2008 | Rytivaara et al. | 345/173 |
| 7,457,636 | B2 * | 11/2008 | Kroll et al. | 455/557 |
| 7,603,105 | B2 * | 10/2009 | Bocking et al. | 455/411 |
| 2007/0011461 | A1 | 1/2007 | Jeng | |
| 2007/0200716 | A1 * | 8/2007 | Haase et al. | 340/574 |
| 2008/0220752 | A1 * | 9/2008 | Forstall et al. | 455/415 |

FOREIGN PATENT DOCUMENTS

| | | |
|---|---|---|
| EP | 0453089 A | 10/1991 |
| JP | 2003058302 A | 2/2003 |
| WO | 9840998 A | 9/1998 |

OTHER PUBLICATIONS

European Search Report for application EP 08150503.4.

* cited by examiner

*Primary Examiner* — Tammara Peyton
(74) *Attorney, Agent, or Firm* — Gowling Lafleur Henderson LLP (57) ABSTRACT

A portable electronic device including a processor provided in a housing, the processor for switching the portable electronic device from a normal operating mode to a device lock mode and a first input device and a second input device provided in the housing. Actuation of the first input device within a maximum delay of actuation of the second input device enables the device lock mode.

13 Claims, 5 Drawing Sheets

METHOD AND APPARATUS FOR ENABLING AND DISABLING A LOCK MODE BY SQUEEZING OR PINCHING THE SIDES OF A PORTABLE ELECTRONIC DEVICE TOWARDS ONE ANOTHER

TECHNICAL FIELD

The present disclosure relates to a method and apparatus for enabling and disabling a lock mode, in particular, a method and apparatus for enabling and disabling a lock mode on a portable electronic device.

BACKGROUND

When not in use, mobile communication devices such as cell phones or PDAs are typically carried in pockets, briefcases or handbags. Often the devices are bumped or jarred during transportation causing device input, such as keystrokes or touchscreen selections, to occur inadvertently. This device input can result in unintentional phone calls being made, corruption of data or battery drainage.

In order to reduce the occurrence of inadvertent device input, many mobile communication devices include a lock mode in which keystrokes or touchscreen selections are not registered. The lock mode is enabled and disabled in different ways depending on the type of device. For example, the lock mode may be enabled by pressing and holding a particular key or touchscreen icon, by pressing a particular key or touchscreen icon twice in succession or by sliding the device into a carrying case of some sort. Similarly, the lock mode may be disabled by pressing and holding the same key or touchscreen icon that locked the device, by pressing a key or touchscreen icon that launches an "unlock" menu option on the display screen of the device, or by removing the device from a carrying case.

The existing lock mode enabling/disabling methods typically consume extra time because the user often looks for a visual confirmation that the action has been successfully completed on the display screen. In addition, some existing methods are difficult to execute if the user is not looking at the device.

Pressing and holding a key or touchscreen icon for a specified amount of time does not provide any user feedback and typically results in the user checking the display screen in order to confirm that the action has taken place. In addition, if the lock/unlock selector is part of the keypad or is one of a group of touchscreen icons, blind identification may be difficult and the user may be reluctant to perform the locking/unlocking action without looking at the device.

Devices that include different input combinations assigned to enabling and disabling the lock mode require additional learning since the user must remember a different set of keystrokes or touchscreen selections for each. Again, the user would typically look at the device while enabling or disabling the lock mode or shortly thereafter in order to confirm that the action was performed successfully.

DRAWINGS

The following figures set forth embodiments in which like reference numerals denote like parts. Embodiments are illustrated by way of example and not by way of limitation in the accompanying figures.

DETAILED DESCRIPTION

There is disclosed herein a portable electronic device including: a processor provided in a housing, the processor for switching the portable electronic device from a normal operating mode to a device lock mode, a first input device and a second input device provided in the housing and wherein actuation of the first input device within a maximum delay of actuation of the second input device enables the device lock mode.

There is further disclosed herein a method for enabling a device lock mode including: actuating a first input device of a portable electronic device and generating a first input signal, actuating a second input device of the portable electronic device and generating a second input signal, receiving and comparing the first input signal and the second input signal at a processor and switching the portable electronic device from a normal operating mode to the device lock mode when the first input signal and the second input signal occur within a maximum delay of one another.

There is further disclosed herein a portable electronic device including: a processor provided in a housing, the processor for switching the portable electronic device from a normal operating mode to a device lock mode and a first input device and a second input device provided in the housing, wherein substantially simultaneous actuation of the first input device and the second input device enables the device lock mode.

Figure 1:
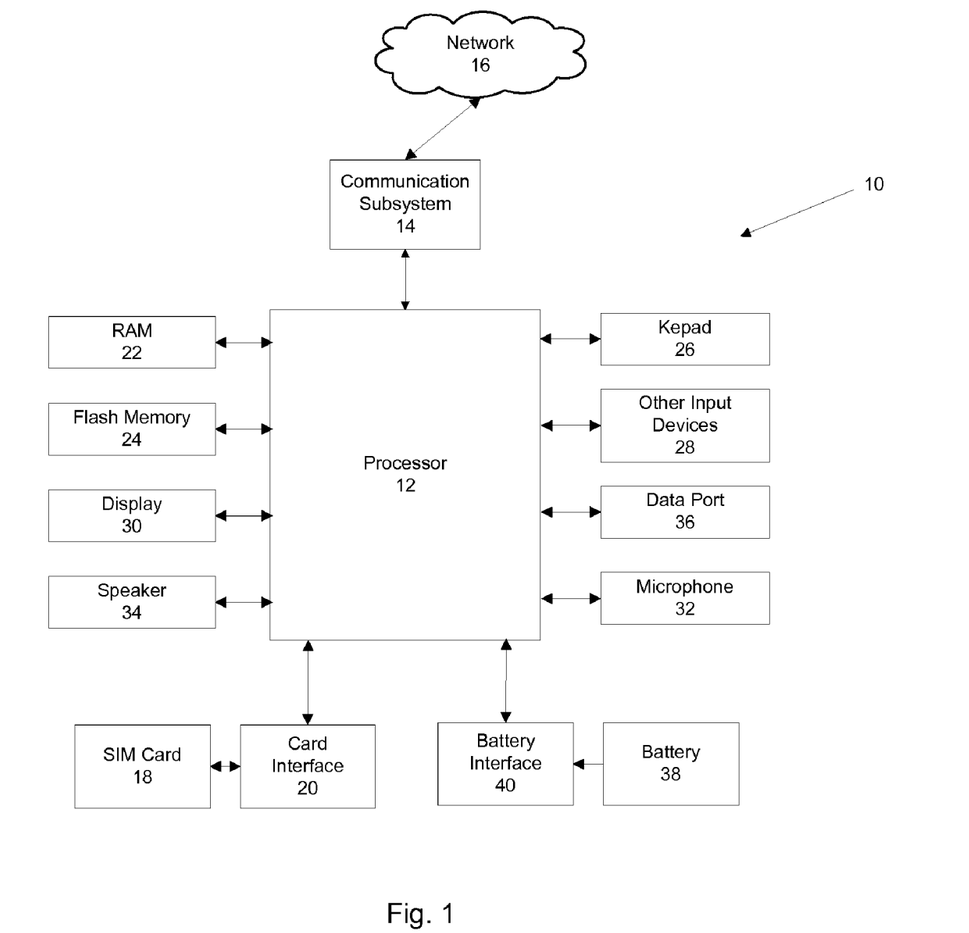
FIG. 1 is a block diagram of an embodiment of a portable electronic device.
Figure 2:
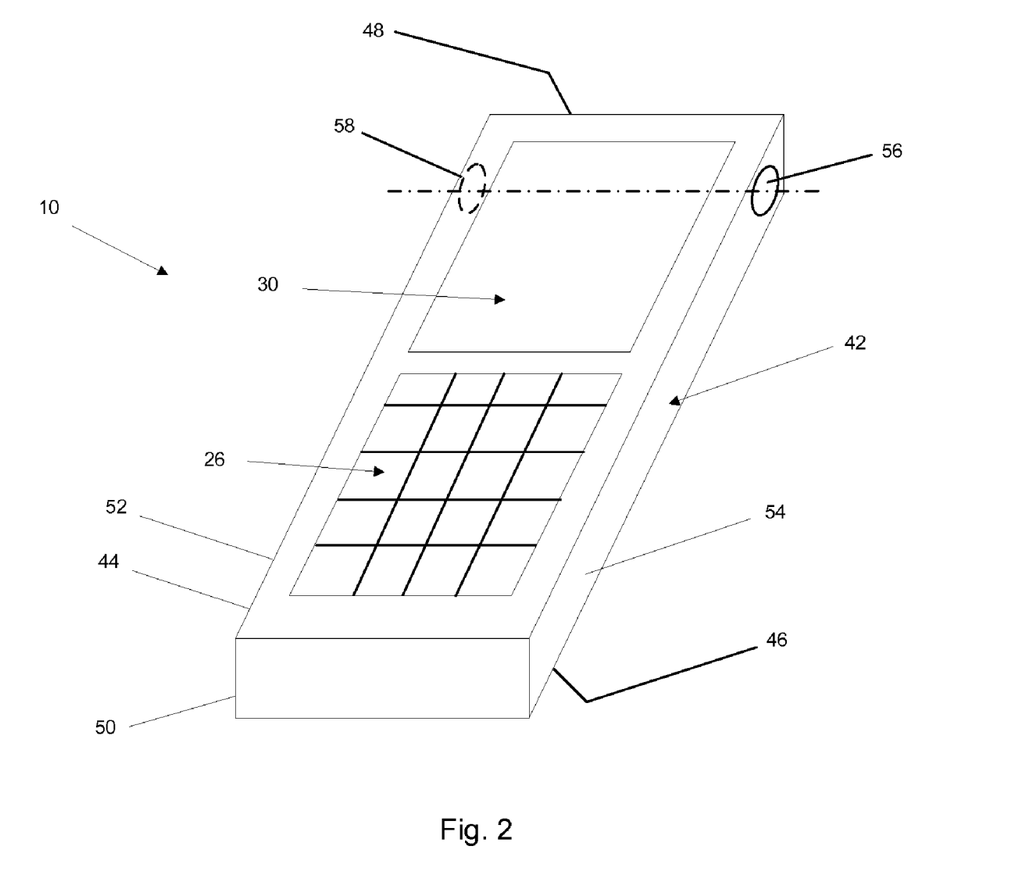
FIG. 2 is isometric view of the portable electronic device of FIG. 1.

Referring to FIGS. 1 and 2, components of a portable electronic device 10 according to an embodiment are generally shown. The portable electronic device 10 includes data communication capabilities and may communicate with other electronic devices directly or through a wireless network. The portable electronic device 10 is based on the computing environment and functionality of a handheld computer, such as a wireless personal digital assistant (PDA), for example. It will be understood, however, that the portable electronic device 10 is not limited to a wireless personal digital assistant. Other portable electronic devices are possible, such as cellular telephones, smart telephones, and laptop computers.

The portable electronic device 10 includes a number of components including processor 12, which controls the overall operation of the device 10. A communication subsystem 14 controls data and voice communication functions, such as email, PIN (Personal Identification Number) message functions, SMS (Short Message Service) message functions and cellular telephone functions, for example. The communication subsystem 14 is in communication with a wireless network 16, which may be a data-centric wireless network, a voice-centric wireless network or a dual-mode wireless network.

In FIG. 1, the communication subsystem 14 is a dual-mode wireless network that supports both voice and data communications. The communication subsystem 14 is configured in accordance with the Global System for Mobile Communication (GSM) and General Packet Radio Services (GPRS) standards. The communication subsystem 14 may alternatively be configured in accordance with Enhanced Data GSM Environment (EDGE) or Universal Mobile Telecommunications Service (UMTS) standards. Other wireless networks may also be associated with the portable electronic device 10, including Code Division Multiple Access (CDMA) or CDMA2000 networks. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The wireless network 16 includes base stations (not shown) that provide a wireless link to the portable electronic device 10. Each base station defines a coverage area, or cell, within which communications between the base station and the portable electronic device 10 can be effected. It will be appreciated that the portable electronic device 10 is movable within the cell and can be moved to coverage areas defined by other cells. Data is delivered to the portable electronic device 10 via wireless transmission from base station. Similarly, data is sent from the portable electronic device 10 via wireless transmission to the base station.

The communication subsystem 14 further includes a short range communications function, which enables the device 10 to communicate directly with other devices and computer systems without the use of the network 106 through infrared or Bluetooth™ technology, for example.

Prior to the portable electronic device 10 being able to send and receive communication signals over the wireless network 16, network registration or activation procedures must have been completed. In order to enable network communication, a SIM (Subscriber Identity Module) card 18 is inserted into a card interface 20. The SIM card, or Removable User Identity Module card, is used to identify the user of the mobile device, store personal device settings and enable access to network services, such as email and voice mail, for example, and is not bound to a particular portable electronic device 10.

The processor 12 is also connected to a Random Access Memory (RAM) 22 and a flash memory 24. An operating system and device software are typically stored in flash memory 24 and are executable by the processor 12. Some device software components may alternatively be stored in RAM 22. Software applications that control basic device operation, such as voice and data communication, are typically installed during manufacture of the device 10. For devices that do not include a SIM card 18, user identification information may be programmed into the flash memory 24. The flash memory 24 may alternatively be a persistent storage, a Read-Only Memory (ROM) or other non-volatile storage.

The processor 12 receives input from various input devices including a keypad 26 and other input devices 28. The other input devices 28 typically complement the keypad 26 to facilitate input and may include devices such as: single or multi-function buttons, a touch screen, a mouse, a trackball, a capacitive touch sensor or a roller wheel with dynamic button pressing capability.

The processor 12 outputs to various output devices including an LCD display screen 30. A microphone 32 and speaker 34 are connected to the processor 12 for cellular telephone functions. A data port 36 is connected to the processor 12 for enabling data communication between the portable electronic device 10 and another computing device. The data port 36 may include data lines for data transfer and a supply line for charging a battery 38 of the portable device 10. Battery interface 40 is provided for receiving one or more rechargeable batteries 38.

Only a limited number of device subsystems have been described. It will be appreciated by a person skilled in the art that additional subsystems corresponding to additional device features may also be connected to the processor 12.

As shown in FIG. 2, portable electronic device 10 includes a housing 42, which contains the device components, which are shown in FIG. 1. The housing 42 includes a front surface 44, a rear surface 46, a top surface 48, a bottom surface 50 and left and right surfaces, 52 and 54, respectively. It will be appreciated that the housing 42 is not limited to the shape shown in FIG. 2. The housing 42 may be any shape and may be manufactured with any number of parts that are assembled in any configuration.

Figure 3:
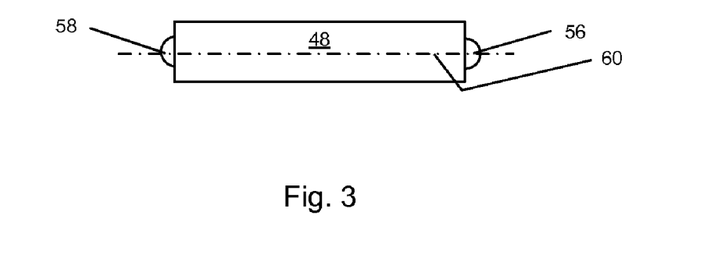
FIG. 3 is a top view of the portable electronic device of FIG. 2.

Referring still to FIG. 2, the keypad 26 and display screen 30 are mounted in the front surface 44 of the housing 42. First and second input devices 56, 58 are provided on opposing sides of the portable electronic device. In the embodiment of FIGS. 2 and 3, the input devices are: a first button 56 that is provided in the right surface 54 of the portable electronic device 10 and a second button 58 that is provided in the left surface 52 thereof. The buttons 56, 58 intersect an activation axis 60, which is generally aligned with the shortest distance between the buttons 56, 58. Similar to keys on the keypad 26, the buttons 56, 58 may be actuated by a user.

The portable electronic device 10 is operable in a normal operating mode and a device lock mode. When the portable electronic device 10 is operating in a normal operating mode, keystrokes on the keypad 26 or input from other input devices 28 including buttons 56, 58 is received by the processor. The keystrokes are processed and appear on the display screen 26 as characters or, alternatively, the keystrokes function to navigate through menu options that are available for various software applications on the device 10. When the portable electronic device 10 is operating in device lock mode, input received by the processor is processed in a different manner. Emergency calls, such as 911, for example, are still processed as though the device 10 is operating in the normal operating mode. This ensures that emergency calls can be placed by another person without disabling the device lock mode. Other keystrokes or input, however, do not result in the regular action being taken. Instead, a message is displayed on the screen to alert the user that the device 10 is operating in device lock mode and provide instructions for disabling the device lock mode. Alternatively, no message is displayed and the processor takes no action in response to keystrokes or other input when in device lock mode.

Figure 4:
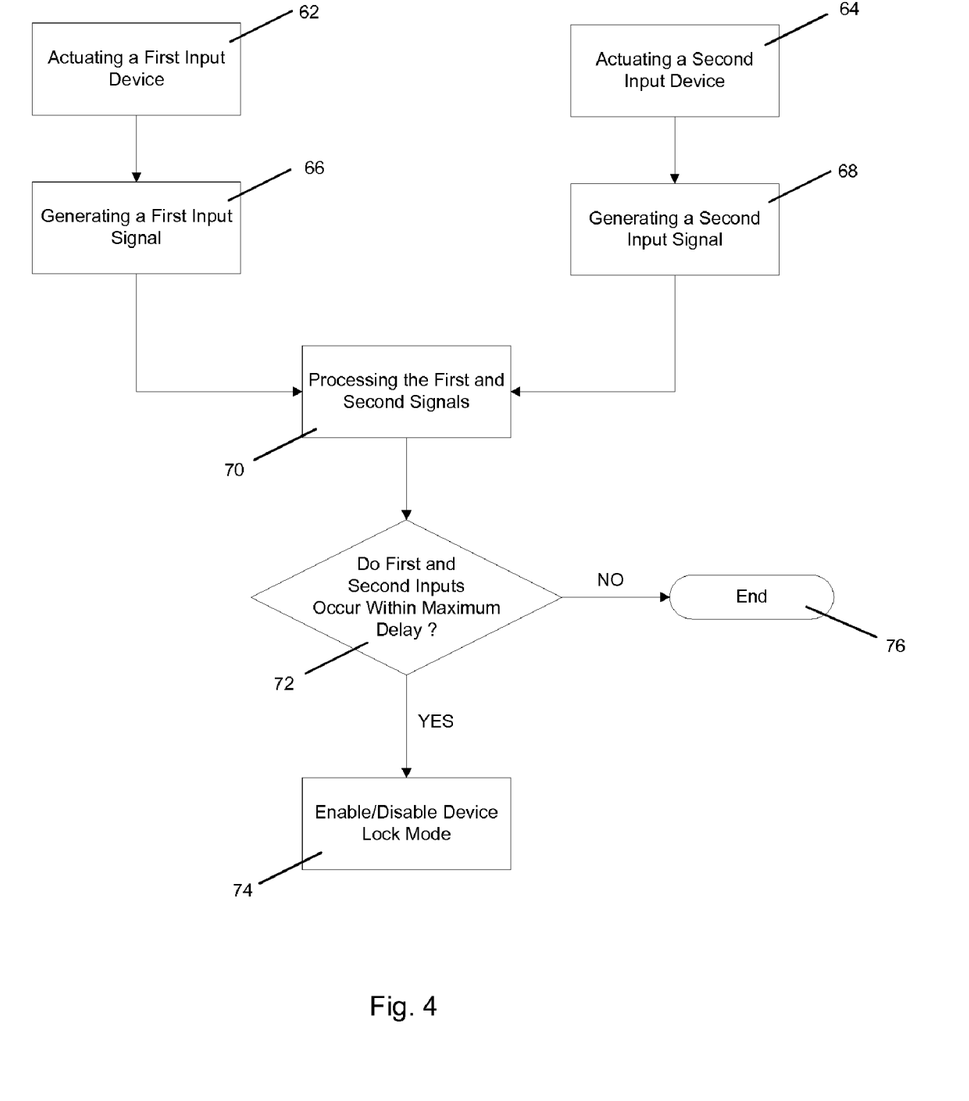
FIG. 4 is a flowchart outlining a method for enabling a lock mode on a portable electronic device.

Device lock mode may be enabled and disabled by simultaneously actuating the buttons 56 and 58 toward one another along the axis 60. The simultaneous actuation along axis 60 corresponds to a pinching action by the user. Referring to FIG. 4, a method for enabling a device lock mode on a portable electronic device 10 is shown. At steps 62 and 64, a user presses the first button 56 and the second button 58. Following button actuation, first and second input signals are generated by first and second electrical switches, respectively, as indicated at steps 66 and 68. The switches may operate to send an interrupt to the processor or a scanning system may be provided to check the state of the switches.

The device 10 senses two distinct actions when a button is pressed: a keydown event related to the button push and a keyup event related to the button release. At step 70, the event signals are processed by the processor 12. At step 72, the processor 12 compares the signals corresponding to the keydown events in order to determine if the buttons 56, 58 were pressed substantially simultaneously. Coordinating keydown actions on the buttons 56, 58 so that they occur at the same time is difficult for the user. As a result, a delay between the input signals received by the processor 12 typically occurs. In order to compensate for any lag between button actuation, the processor allows for a delay between keydown events of the buttons 56, 58. If the delay is less than or equal to 0.25 seconds, the processor 12 enables the device lock mode, as indicated at step 74. If the delay is greater than 0.25 seconds, no action is taken by the processor 12, as indicated at step 76. The same process is performed when the device 10 is operating in device lock mode to disable the device lock mode.

It will be appreciated by a person skilled in the art that the maximum delay between keydown events when enabling or disabling device lock mode may be increased or decreased depending on the device. Testing for a particular device would be performed in order to determine the appropriate maximum delay between button actuation.

In another embodiment, the processor 12 compares both the keydown events and the keyup events. The purpose of comparing the keyup events is to determine if an inadvertent locking or unlocking attempt has taken place. Therefore, if the buttons 56, 58 are depressed within the maximum delay of one another but both keys are held for more than 3 seconds, the device 10 determines that this is an accidental unlocking attempt and takes no action. Such an accidental locking or unlocking event may occur when the device 10 is sandwiched in a briefcase or purse.

It will be appreciated that the 3 second maximum hold time may be increased or decreased depending on the type of device. In many devices, keys actuated over a duration for enabling/disabling device lock mode are common. Therefore, in an embodiment, the processor 12 provides screen output explaining to the user that holding of the buttons is unnecessary after and continued holding will result in the device lock disabling action being ignored. In one example, the screen output is generated at approximately 2 seconds and after 5 seconds of holding, the unlock signal is ignored by the processor 12 and the unlocking function is cancelled.

In another embodiment, the device 10 favors enabling device lock mode over disabling device lock mode. In order to achieve this, the delay would be adjusted to be a maximum of 0.5 seconds when the user is attempting to lock the device and a maximum of 0.25 seconds when the user is attempting to unlock the device 10. Thus a larger margin of error for the user pinch is provided when locking the device 10.

Figure 5:
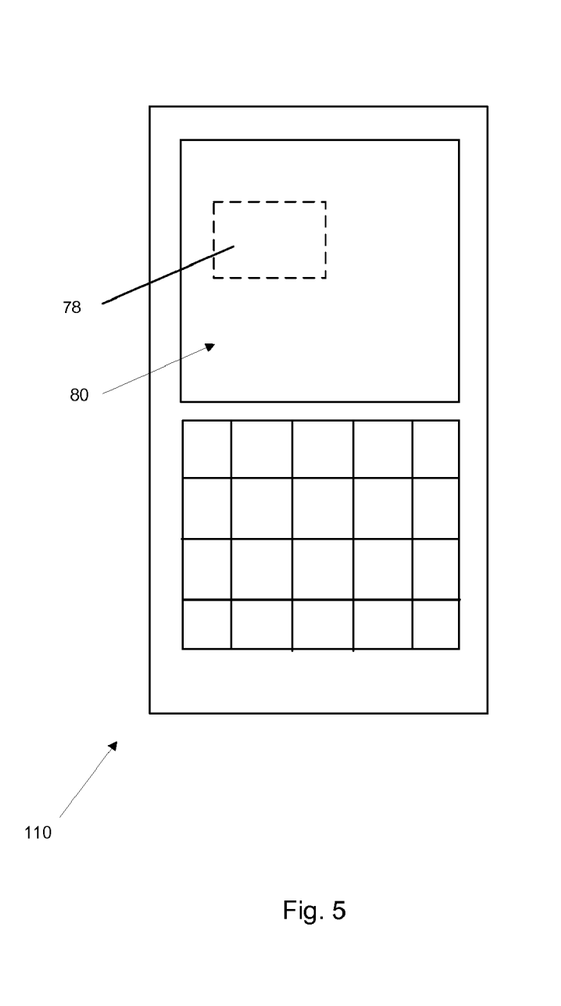
FIG. 5 is a front view of a portable electronic device according to another embodiment.
Figure 6:
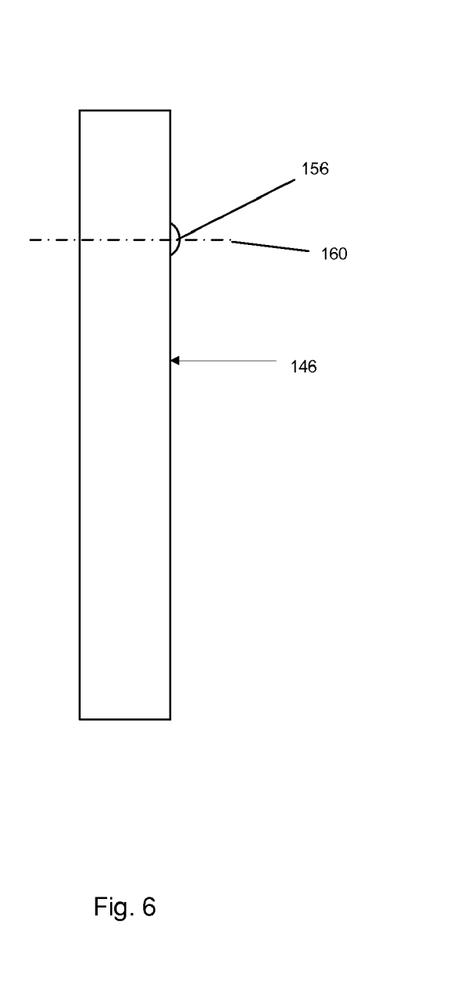
FIG. 6 is a side view of the portable electronic device of FIG. 5.

Referring to FIGS. 5 and 6, another embodiment of a portable electronic device 110 is shown. The reference numerals used in describing the previous embodiment will be repeated and raised by 100 to describe the present embodiment.

The portable electronic device 110 includes a first input device in the form of a first button 156, which is provided in a rear surface 146 of the device 110, and a second input device in the form of an activation area 78 of a touchscreen 80. The touchscreen 80 may be configured to receive either capacitive or resistive input. The first button 156 and the activation area 78 both intersect an activation axis 160. In order to enable device lock mode, the user pinches the device 110 to engage the first button 156 and activation area 78 simultaneously, as has been previously described with reference to FIG. 4. When the device is in lock mode, the touchscreen 80 is disabled in order to save power. Once the first button 156 is pressed, the touchscreen 80 turns on to see if the user's finger is present in the activation area 78 and, if so, the device unlock enabling action is completed.

Figure 7:
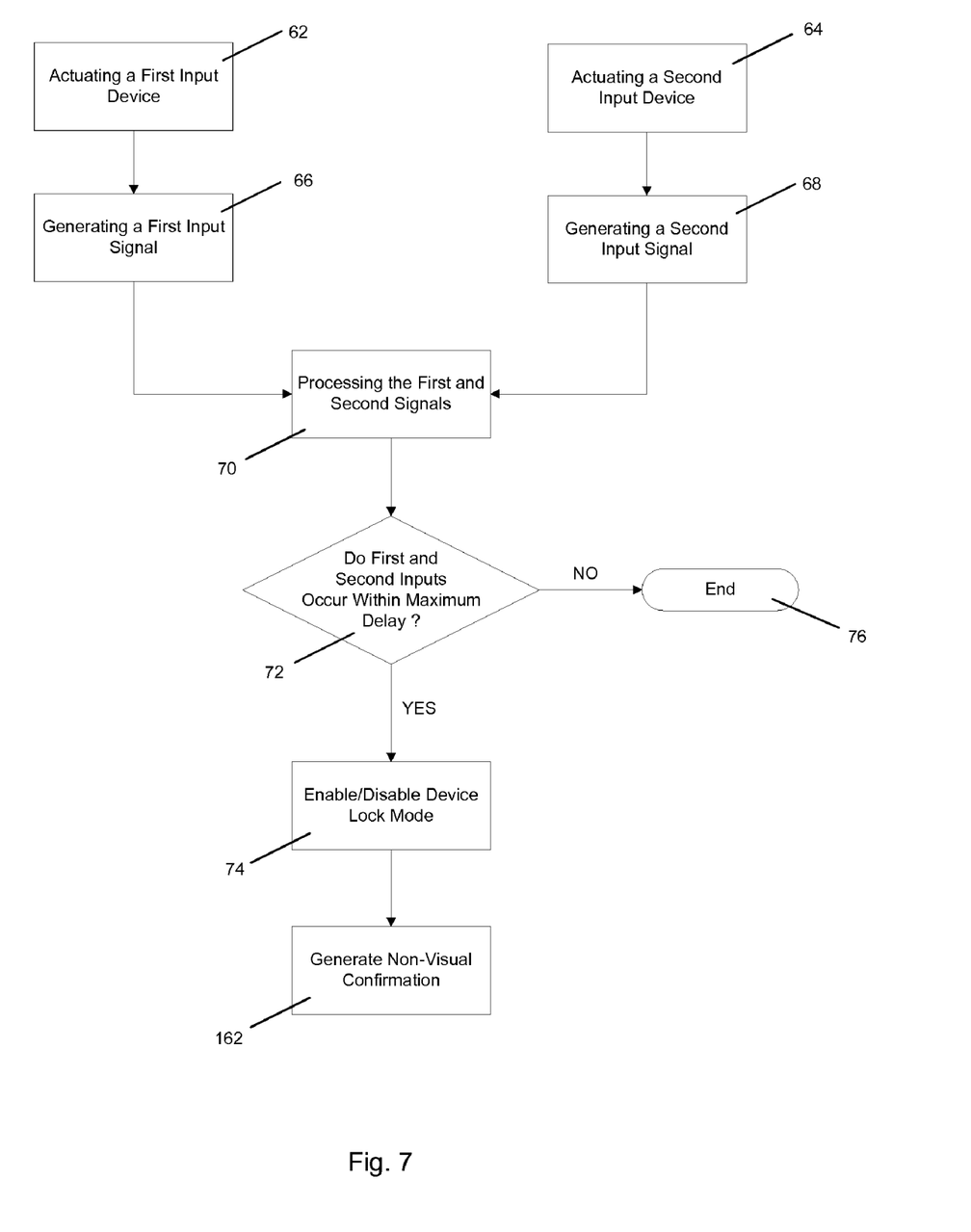
FIG. 7 is a flowchart outlining another method for enabling a lock mode on a portable electronic device.

In another embodiment, which is shown in FIG. 7, a non-visual confirmation is provided to the user when the device lock mode is engaged or disengaged. The method of FIG. 7 is similar to the method of FIG. 4 but further includes generating a non-visual confirmation as indicated at step 162. The portable electronic device 10 may vibrate a single time to confirm that device lock mode has been enabled and may vibrate twice to confirm that device lock mode has been disabled. Alternatively, an auditory confirmation may be provided in which different sounds correspond to locking and unlocking of the device 10.

The device 10 may include a click reproducing haptic system to provide the non-visual confirmation. The user could experience no feel when the input devices are pressed individually but experience a distinct click when the input devices are pressed substantially simultaneously. This would provide the user with immediate feedback that the input devices have been actuated correctly and the device lock mode will be enabled/disabled.

In another embodiment the first and second input devices are capacitive touch sensors.

In still another embodiment, first input device is a button and second input device is a capacitive touch sensor. This arrangement provides physical feedback from a single button. The capacitive sensor is turned on when the button is pressed to reduce device power consumption. This provides an added level of security because capacitive sensors are only responsive to the presence of skin, therefore, inadvertent actuation by pressure from another object would not trigger the lock/unlock mode.

It will be appreciated by a person skilled in the art that any suitable combination of buttons, touchscreens, touch sensors or other input devices may be used to provide a system for enabling and disabling a device lock mode as described herein.

It will further be appreciated by a person skilled in the art that any existing device input, such as a key on the keypad 28 or a trackball, can be configured for use as the first input device 56. A second input device 58, such as a button or touch sensor, for example, would then be provided on the opposite side of the device 10 and aligned with the first input device 56. The existing device inputs would perform their regular function unless actuated as part of a device lock/unlock user pinch action, as has been previously described.

Specific embodiments have been shown and described herein. However, modifications and variations may occur to those skilled in the art. All such modifications and variations are believed to be within the scope and sphere of the present embodiments.

The invention claimed is:

1. A portable electronic device comprising:
    a processor provided in a housing, said processor for switching said portable electronic device from a normal operating mode to a device lock mode that still permits an emergency call to be placed without disabling the device lock mode;
    a first input device and a second input device in communication with said processor, said first input device and said second input device being provided in said housing on opposing sides of said portable electronic device, said first input device and said second input device intersecting an activation axis and being actuable toward one another along said activation axis, said activation axis being aligned with the shortest distance between said first input device and said second input device;
    wherein actuation of said first input device within a maximum delay of actuation of said second input device enables said device lock mode, wherein actuation of said first input device within said maximum delay of actuation of said second input device enables said normal operating mode when said portable electronic device is operating in said device lock mode, and wherein at least one of said first input device and said second input device is a capacitive touch sensors.

2. A portable electronic device as claimed in claim 1, wherein said first input device is provided on a front surface of said portable electronic device and said second input device is provided on a rear surface of said portable electronic device.

3. A portable electronic device as claimed in claim 1, wherein said first input device is provided on a left surface of said portable electronic device and said second input device is provided on a right surface of said portable electronic device.

4. A portable electronic device as claimed in claim 1, wherein said maximum delay is 0.25 seconds.

5. A portable electronic device as claimed in claim 1, wherein said processor receives signals corresponding to keydown events and keyup events for each of said input devices, said keydown events being compared when determining if actuation of said first input device occurs within said maximum delay of actuation of said second input device.

6. A portable electronic device as claimed in claim 5, wherein said keyup events are compared by said processor in order to detect inadvertent button actuation, if a maximum hold time of both buttons exceeds 3 seconds, enablement of said lock mode is cancelled.

7. A method for enabling a device lock mode of a portable electronic device comprising:
   actuating a first input device of said portable electronic device and generating a first input signal, said first input device having a capacitive touch sensor and being mounted in a housing of said portable electronic device and provided in communication with a processor of said portable electronic device;
   actuating a second input device of said portable electronic device toward said first input device along an activation axis, said activation axis extending between opposing sides of said portable electronic device and being aligned with the shortest distance between said first input device and said second input device, actuation of said second input device generating a second input signal, said second input device having a capacitive touch sensor and being mounted in said housing of said portable electronic device and provided in communication with said processor of said portable electronic device;
   receiving and comparing said first input signal and said second input signal at said processor;
   switching said portable electronic device from a normal operating mode to said device lock mode when said first input signal and said second input signal occur within a maximum delay of one another and, when the portable electronic device is operating in said device lock mode, switching said portable electronic device from said device lock mode to said normal operating mode when said first input signal and said second input signal occur within a maximum delay of one another wherein said device lock mode still permits an emergency call to be placed without disabling said device lock mode.

8. A method as claimed in claim 7, further comprising:
   generating a non-visual confirmation after successful enablement of said device lock mode.

9. A method as claimed in claim 8, wherein said non-visual confirmation is a vibration.

10. A method as claimed in claim 8, wherein said non-visual confirmation is a sound.

11. A portable electronic device as claimed in claim 7, wherein each of said first input signal and said second input signal include a keydown event and a keyup event, said keydown events being compared when determining if actuation of said first input device occurs within said maximum delay of actuation of said second input device.

12. A portable electronic device as claimed in claim 11, wherein said keyup events are compared by said processor in order to detect inadvertent input device actuation, if a maximum hold time of both input devices exceeds 3 seconds, enablement of said lock mode is cancelled.

13. A portable electronic device comprising:
   a processor provided in a housing, said processor for switching said portable electronic device from a normal operating mode to a device lock mode that still permits an emergency call to be placed without disabling the device lock mode;
   a first input device and a second input device in communication with said processor, said first input device and said second input device being provided in said housing on opposing sides of said portable electronic device, said first input device and said second input device intersecting an activation axis and being actuable toward one another, said activation axis being aligned with the shortest distance between said first input device and said second input device;
   wherein substantially simultaneous actuation of said first input device and said second input device enables said device lock mode, and wherein at least one of said first input device and said second input device is a capacitive touch sensor and wherein substantially simultaneous actuation of said first input device and said second input device enables said normal operating mode when said portable electronic device is operating in said device lock mode.

* * * * *

UNITED STATES PATENT AND TRADEMARK OFFICE
CERTIFICATE OF CORRECTION

PATENT NO. : 8,099,526 B2
APPLICATION NO. : 12/017470
DATED : January 17, 2012
INVENTOR(S) : Griffin et al.

Page 1 of 1

It is certified that error appears in the above-identified patent and that said Letters Patent is hereby corrected as shown below:

In the Claims

Column 7, line 7, "sensors" should read -- sensor --.

Signed and Sealed this
Twenty-sixth Day of November, 2013

Margaret A. Focarino
*Commissioner for Patents of the United States Patent and Trademark Office*